UNITED STATES PATENT OFFICE.

GEORGES ROCOUR, OF LIEGE, BELGIUM.

PROCESS OF TREATING PHOSPHATIC SLAGS FOR MANURE, &c.

SPECIFICATION forming part of Letters Patent No. 284,674, dated September 11, 1883.

Application filed April 24, 1883. (No specimens.) Patented in France January 18, 1882, No. 146,915; in England January 20, 1882, No. 299; in Belgium January 20, 1882, No. 56,832; in Luxemburg January 20, 1882, No. 177, and in Germany January 28, 1882, No. 21,240.

*To all whom it may concern:*

Be it known that I, GEORGES ROCOUR, a citizen of Belgium, residing at Liege, in the Kingdom of Belgium, have invented certain new and useful Improvements in the Utilization of Phosphatic Metallic Slags; and I do hereby declare the following to be a full, clear, and exact description of the invention, such as will enable others skilled in the art to which it appertains to make and use the same.

The object of this invention is to obtain in a commercial form the phosphoric acid contained in the metallic slags or cinders obtained in the metallurgical operations (known as the "basic" process or "Thomas Gilchrist" process) of puddling. The invention may, however, be advantageously applied to the recovery of phosphoric acid from other natural or artificial compounds too poor in phosphoric acid, or containing too much lime, magnesia, iron, or manganese to be economically or advantageously treated with acids for producing superphosphate.

In carrying out my invention the first operation consists in the fusion of the phosphatic matter containing iron and manganese, or that is mixed with a sufficient proportion of matter containing those metals, in order to convert the phosphorus into a phosphide of iron and manganese, which I name "phosphoric matte." The fusion must be effected under reducing conditions, and I prefer to use for that purpose a cupola or blast-furnace; but reverberatory or crucible furnaces could also be used if coal is added to the mixture. The phosphoric matters to be melted should contain or be mixed with suitable fluxes as to contain from three to four parts of iron and manganese together, to one of phosphoride or phosphoric matter, and thirty to fifty parts of silica for fifty to seventy of alumina, lime, and magnesia together. The fuel should be coke, anthracite coal, or charcoal, and the temperature high enough to reduce a large portion of the oxide of manganese contained in the mass. The products of the smelting are a phosphoric matte with twenty to twenty-five per cent. of phosphorus and a slag very poor in phosphoric acid. A small portion of the phosphorus is volatilized and escapes with the furnace-gases, and, if in sufficient quantity, could be recovered by condensation. The phosphoric matte obtained can be treated by either one or the other of the following processes, the economical working being taken into consideration:

First. The phosphoric matte obtained as above set forth, in a fused condition, or after remelting in a cupola, is blown in a basic converter, the same as ordinary pig-iron, with the addition of two to four parts of lime or calcined dolomite for one part of phosphorus in the matte. Small quantities of sulphate or carbonate of soda can be added in the converter to facilitate the fusion of the phosphoric slag produced, and for the same purpose it will be well to add the lime or dolomite and the sulphate or carbonate of soda gradually, so that the fresh additions may be melted in a pre-existing slag floating on the metallic bath by the increasing temperature produced by the oxidation of the phosphorus by the blast. On lowering the converter before complete dephosphorization of the metal a slag very rich in phosphoric acid and rather poor in manganese and iron can be run out, which slag can be utilized as natural phosphoride, or treated with sulphuric acid for obtaining superphosphates for agricultural purposes.

Secondly. The phosphoric matte is mixed with three to seven parts of sulphate of soda or potash for one part of phosphorus in the matte and about one-half part of coal or coke. The whole mixture is then ground and heated to redness in a reverberatory furnace, first by a reducing-flame, and then the mass is stirred under the action of an oxidizing-flame and the temperature raised as high as possible. By that treatment the phosphorus of the matte is oxidized and converted into phosphate of soda or potash, a part of the combined iron and manganese being converted into oxides and part into sulphides. It may be found useful, in order to facilitate the reaction, to add to the mixture heated in the reverberatory furnace from ten to twelve parts of sulphur, or, instead of sulphur, forty to forty-two parts of iron pyrites, for every one hundred parts of phosphorus in the matte. The mass, after being cooled, is then lixiviated, and the phosphate of soda or potash obtained in solution can be crystallized and utilized in that form as a chemical fertilizer, in which will be found in all cases all the phosphoric acid contained in the matte in a soluble condition, and all the potash when sulphate of potash has been used in the process.

When sulphate of soda has been used, the phosphatic solution can be precipitated by means of lime and a commercial precipitate of phosphate of calcium obtained, and by concentrating the liquid by evaporation a commercial caustic soda is obtained. If an excess of sulphate has been used in the initial mixture of the matte, the correspondent alkali will be found in the form of a sulphide in the solution, instead of a phosphate. This sulphide, when evaporated to dryness, can be utilized, instead of a part of the sulphate and coal in the mixture, for succeeding operations; or it may be treated by the well-known processes for obtaining caustic alkali. The insoluble residues of lixiviation can be roasted to eliminate the sulphur, and a purple ore is obtained, which may be melted for pig-iron.

Having thus described the nature of the invention and the manner in which it is to be performed, I claim—

1. The process of utilizing phosphatic cinders or slags, which consists in reducing, by roasting, the phosphate of iron into a phosphide, and converting the latter into a soluble alkaline phosphate by furnacing with an alkaline sulphate and carbon, as described.

2. The process of utilizing phosphatic cinders or slags, which consists in reducing, by roasting, the phosphate of iron into a phosphide in the form of a matte containing the phosphorus, iron, and manganese of the cinders or slags, and converting the phosphide of the matte into a soluble alkaline phosphate by oxidation with a sulphate of sodium or potassium, carbon, and sulphur or iron pyrites, in or about in the proportions specified.

In testimony whereof I affix my signature in presence of two witnesses.

GEORGES ROCOUR.

Witnesses:
JH. CHECK,
PAUL NOBLET.